United States Patent
Korzhenko et al.

(10) Patent No.: US 9,896,611 B2
(45) Date of Patent: Feb. 20, 2018

(54) MASTERBATCH FOR MANUFACTURING A DRILLING FLUID

(75) Inventors: Alexander Korzhenko, Pau (FR); Mickael Havel, Buros (FR); Catherine Bluteau, Orthez (FR)

(73) Assignee: ARKEMA FRANCE, Colombes (FR)

( * ) Notice: Subject to any disclaimer, the term of this patent is extended or adjusted under 35 U.S.C. 154(b) by 1077 days.

(21) Appl. No.: 13/497,559

(22) PCT Filed: Sep. 23, 2010

(86) PCT No.: PCT/FR2010/051996
§ 371 (c)(1),
(2), (4) Date: Apr. 26, 2012

(87) PCT Pub. No.: WO2011/036411
PCT Pub. Date: Mar. 31, 2011

(65) Prior Publication Data
US 2012/0277125 A1    Nov. 1, 2012

Related U.S. Application Data

(60) Provisional application No. 61/247,186, filed on Sep. 30, 2009.

(30) Foreign Application Priority Data

Sep. 25, 2009 (FR) ..................... 09 56637

(51) Int. Cl.
| C09K 8/32 | (2006.01) |
| B82Y 30/00 | (2011.01) |
| C08J 3/22 | (2006.01) |
| C08J 5/00 | (2006.01) |
| C08K 3/04 | (2006.01) |
| C08K 7/24 | (2006.01) |
| C09K 8/34 | (2006.01) |
| C09K 8/03 | (2006.01) |

(52) U.S. Cl.
CPC ............. *C09K 8/32* (2013.01); *B82Y 30/00* (2013.01); *C08J 3/22* (2013.01); *C08J 5/005* (2013.01); *C08K 3/04* (2013.01); *C08K 7/24* (2013.01); *C09K 8/032* (2013.01); *C09K 8/34* (2013.01); *C09K 2208/10* (2013.01)

(58) Field of Classification Search
CPC .. B82Y 30/00; C08J 3/22; C08J 5/005; C08K 3/04; C08K 7/24; C09K 2208/10; C09K 8/032; C09K 8/32; C09K 8/34
See application file for complete search history.

(56) References Cited

U.S. PATENT DOCUMENTS

| 4,735,733 A | | 4/1988 | Blumenthal et al. | |
| 7,449,432 B2* | | 11/2008 | Lockwood et al. | 508/113 |
| 2007/0293405 A1* | | 12/2007 | Zhang et al. | 508/113 |
| 2008/0312364 A1 | | 12/2008 | Piccione et al. | |
| 2010/0300759 A1 | | 12/2010 | Passade-Boupat et al. | |
| 2011/0121242 A1* | | 5/2011 | De Gunst | 252/511 |

FOREIGN PATENT DOCUMENTS

| EP | 1 634 938 A1 | 3/2006 |
| EP | 1 995 274 A1 | 11/2008 |
| FR | 2 893 946 A1 | 6/2007 |
| JP | 2007-231219 A | 9/2007 |
| WO | WO 03 050332 A1 | 6/2003 |
| WO | WO 2005/037966 A1 | 4/2005 |
| WO | WO 2005/060648 A2 | 7/2005 |
| WO | WO 2006/076728 A2 | 7/2006 |
| WO | WO 2006/082325 A1 | 8/2006 |
| WO | WO 2009/030868 A2 | 3/2009 |

OTHER PUBLICATIONS

English translation (machine) of JP 2007231219A, obtained Jan. 21, 2015.*
Peigney et al, Specific surface area of carbon nanotubes and bundles of carbon nanotubes, Carbon, 39, 2001, 507-514.*
International Search Report (PCT/ISA/210) dated Jan. 27, 2011, by French Patent Office as the International Searching Authority for International Application No. PCT/FR2010/051996.

* cited by examiner

*Primary Examiner* — Alicia Bland
(74) *Attorney, Agent, or Firm* — Buchanan Ingersoll & Rooney P.C.

(57) ABSTRACT

An oil-based masterbatch in the form of granules containing carbon nanotubes. Also, a method for preparing an oil-based masterbatch in the form of granules containing carbon nanotubes. Also, the use of an oil-based masterbatch in the form of granules containing carbon nanotubes for manufacturing an aqueous or organic viscoelastic fluid, intended for drilling in underground formations.

23 Claims, No Drawings

MASTERBATCH FOR MANUFACTURING A DRILLING FLUID

The present invention relates to an oil-based masterbatch containing carbon nanotubes to a process for producing it and to its use for the manufacture of a viscoelastic fluid intended for drilling in subterranean formations.

Drilling fluids, also called drilling muds, are complex fluids used for drilling oil wells. They are injected, in general continuously, via the drill pipe string, into the borehole. Their many functions comprise for example bringing rock debris up to the surface, maintaining a hydrostatic pressure in the borehole sufficient to prevent collapse of the rock formation penetrated, or else lubricating and cooling the drilling head. They are mainly two families of drilling muds: oil-based muds (generally inverse emulsions of brine in an oil phase) and water-based muds.

Maintaining a sufficient hydrostatic pressure, to compensate for the lateral pressure of the rock formation penetrated by the drill well, requires the density of the drilling fluid to progressively increase as the drilling advances towards deeper zones. This density increase is obtained by adding weighting agents, that is to say finely ground solid materials of high density that are insoluble in the drilling fluid. The deeper the drilling well, the larger the amount and/or the higher the density of the weighting agent used, and the more effective the system for keeping the weighting system in suspension in the drilling fluid has to be.

This is because any settling of the weighting agent, for example during a temporary stoppage in mud injection, may have disastrous consequences such as a well being blocked or a local reduction in the hydrostatic pressure of the fluid column, resulting in collapse of the well.

The weighting agent is typically kept in suspension by viscosity agents, conventionally chosen from clays, whether or not organophilic, and organic polymers soluble in the drilling fluid. Now, beyond a certain drilling depth, when the system for keeping the weighting agent in suspension has to be particularly effective, organic polymers undergo degradation due to the high temperatures prevailing at these depths and become partially or completely ineffective.

The problem of thermal degradation of organic polymers cannot be solved simply by replacing them with clays. Admittedly, the clays conventionally used as thickening agents (bentonite, montmorillonite, attapulgite and organophilic clays) withstand markedly higher temperatures than organic polymers, but for drilling at great depth the amount of clay necessary to keep large amounts of very dense weighting agent in suspension is considerable. Drilling muds then have an excessively high solids content, which possesses problems of keeping muds in circulation due to an excessively high viscosity.

The systems currently used, which are based either on polymers or clays, unfortunately does not enable the weighting agent to be kept in suspension above a temperature of about 250° C.

To alleviate these drawbacks of the conventional thickening agents, the Applicant proposed in application WO 2009/030868 to substitute them, completely or partly, with carbon nanotubes (CNTs) having a particular mean diameter and a particular specific surface area. CNTs exhibit excellent heat stability and enable large amounts of very dense weighting agent, such as barite or calcite, without thereby giving the drilling fluid an excessively high viscosity that would in particular impair its pumpability.

As recommended in the above document, it is desirable for the composition of this drilling fluid to be modified over the course of the drilling process, by progressively increasing the CNT content as the drilling depth, the drilling temperature and/or the drilling pressure increases. However, the CNTs are introduced into the drilling fluid in powder form, a form not very easy for handling by drilling mud manufacturers. Furthermore, CNT metering is difficult and handling CNTs can lead to dispersing them in the environment, requiring the use of complex systems of hoods and filters, rooms under reduced pressure and other systems for limiting their dispersion.

It would therefore be desirable to have a means for overcoming this drawback while at the same time enabling carbon nanotubes to be easily dispersed in the liquid base of the drilling fluid.

The Applicant has been able to develop a masterbatch in solid form, containing a large amount of carbon nanotubes and at least one oil, which meets this requirement.

Document U.S. Pat. No. 4,735,733 does teach, admittedly, oily compositions with a high CNT content. However, these are greases containing 5 to 15% by weight of carbon nanotubes, having a mean diameter of 50 to 200 nm and a specific surface area of less than 190 $m^2/g$, which are added to a lubricating oil, such as a mineral oil, having a kinematic viscosity of at least 25 $mm^2/s$. These greases, which take the form of a viscoelastic gel at room temperature, are neither explicitly intended, nor adapted, to be used as CNT masterbatches for the manufacture of drilling fluids.

Other compositions containing CNTs combined with an oil are disclosed in the documents FR 2 893 946, WO 03/050332, WO 2005/060648, WO 2005/037966, WO 2006/076728, EP 1 995 274, JP2007-231219 and US 2007/293405. In these documents, none of which relates to the field of drilling for oil, the compositions containing high CNT contents are not in the form of granules or contain, in addition to the CNTs and oil (silicone or chloroparaffin oil), a resin. These compositions are therefore not adapted for use as masterbatches for the manufacture of drilling fluids either.

A first subject of the present invention is specifically a masterbatch in the form of granules comprising at least one oil, selected from a given list, and more than 3% by weight of carbon nanotubes having a mean diameter of between 5 and 30 nm and a specific surface area greater than 200 $m^2/g$, preferably between 200 $m^2/g$ and 350 $m^2/g$. The oils that can be used in this embodiment of the invention are chosen from: vegetable oils having a high triglyceride content, consisting of fatty acid and glycerol esters; synthetic oils of formula R5COOR6 in which R5 represents an aryl group or the residue of a linear or branched, higher fatty acid containing 7 to 30 carbon atoms, and R6 represents a branched or unbranched hydrocarbon chain, optionally hydroxylated, containing 3 to 30 carbon atoms; synthetic ethers; linear or branched, saturated or unsaturated, $C_6$-$C_{26}$ fatty alcohols; oils of mineral origin; cyclic hydrocarbons such as (alkyl) cycloalkanes and (alkyl)cycloalkenes, the alkyl chain of which is linear or branched, saturated or unsaturated, having 1 to 30 carbon atoms; aromatic hydrocarbons; fluorinated oils such as $C_8$-$C_{24}$ perfluoroalkanes; fluorosilicone oils; and mixtures thereof A second subject of the present invention is a masterbatch in the form of granules, consisting of at least one oil and more than 3% by weight of carbon nanotubes having a mean diameter of between 5 and 30 nm and a specific surface area greater than 200 $m^2/g$, preferably between 200 $m^2/g$ and 350 $m^2/g$.

These masterbatches make it possible in particular to resolve the abovementioned drawbacks. The CNTs can be precisely metered by the mud manufacturer and easily handled without involving a complex antidispersion system.

The carbon nanotubes used in the present invention are known. They have particular crystalline structures, which are tubular and hollow, with a mean length/mean diameter ratio of greater than 1 and made up of one or several sheets or walls of graphite, wound coaxially around the longitudinal axis of the nanotubes. Single-wall nanotubes or SWNTs are thus distinguished from multi-wall nanotubes or MWNTs. According to the invention, multi-wall CNTs are advantageously used which may for example comprise 3 to 15 sheets and more preferably 5 to 10 sheets.

As indicated above, the CNTs used in the present invention have a mean diameter, measured by transmission electron microscopy, of between 5 and 30 nm, preferably ranging from 8 to 15 nm. Their mean length is advantageously between 0.1 and 10 μm. The mean length/mean diameter ratio is advantageously greater than 10 and usually greater than 100.

The specific surface area of the CNTs used in the present invention, determined by the nitrogen adsorption BET method, is greater than 200 $m^2/g$ and preferably between 200 $m^2/g$ and 350 $m^2/g$, for example between 200 $m^2/g$ and 250 $m^2/g$. Their untamped bulk density is preferably between 0.03 and 0.5 $g/cm^3$ and in particular between 0.05 and 0.2 $g/cm^3$. This bulk density is the ratio of a given mass of carbon nanotubes divided by the volume of this same mass, measured after three successive inversions of a specimen containing said nanotubes.

The carbon nanotubes of small mean diameter and high specific surface area used in the present invention may especially be prepared according to the synthesis processes described in International application WO 2006/082325.

Raw carbon nanotubes, i.e. chemically unmodified CNTs, having the above technical characteristics, are also commercially available from the company ARKEMA under the brand name Graphistrength® C100.

According to the invention, the nanotubes may be purified and/or oxidised and/or milled before being incorporated into the masterbatch of the present invention.

The CNTs may be milled, either hot or cold, in apparatus such as a bore mill, a hammer mill, a grinding wheel mill, a knife mill, a gas jet or any other milling system capable of reducing the size of the entangled CNT network. Preferably this milling step is carried out using a gas-jet milling technique and preferably in an air-jet mill.

The raw or milled CNTs may be purified by washing them in a sulphuric acid solution, so as to strip them of any residual mineral and metallic impurities coming from their production process. The CNT/sulphuric acid weight ratio used for this washing may be between 1/2 and 1/3. The purification operation may also be carried out at a temperature ranging from 90 to 120° C., for example for a time of 5 to 10 hours. This operation may advantageously be followed by steps of washing the purified CNTs in water and drying them.

The raw, milled and/or purified CNTs may be oxidised by bringing the nanotubes into contact with a sodium hypochlorite solution, for example in a CNT/sodium hypochlorite weight ratio ranging from 1/0.1 to 1/1, preferably at room temperature. This oxidation operation is advantageously followed by steps of filtering and/or centrifuging, washing and drying the oxidised CNTs.

The CNTs used in the present invention may be chemically modified by introducing functional groups via covalent bonds. These functional groups, such as sulphate, sulphonate, carboxyl, benzenesulphonate and optionally quaternized amine groups, or else groups obtained by the polymerization of monomers on the surface of the CNTs, generally improve the dispersibility of the nanotubes in water or organic solvents.

Furthermore, the CNTs may undergo a heat treatment of at least 900° C. and, better still, at least 1000° C., for the purpose of removing the metallic traces of their synthesis catalyst that may possibly be present.

In the present invention, unmodified CNTs are preferably used.

The masterbatch according to the invention contains more than 3% by weight, but generally from 10% to less than 60% by weight, relative to the total weight of the masterbatch, of carbon nanotubes, preferably from 10 to 55% by weight and more preferably still from 15 to 50% by weight, of carbon nanotubes.

The oil included in the masterbatch according to the invention is defined as a medium which is liquid at room temperature (25° C.) and at atmospheric pressure and is immiscible in water (i.e. forming 2 phases visible to the naked eye at room temperature and atmospheric pressure). This liquid medium has in particular a water solubility, measured according to the OECD TG 105 method, of 1 mg/l or less. This liquid medium may be relatively viscous. In particular, it has a dynamic viscosity at room temperature of between 0.1 cP and 500 cP and preferably between 0.3 and 300 cP.

According to the invention, one or more mutually miscible oils may be used. These oils may be polar oils or, better still, apolar oils.

Examples of oils suitable for use in the present invention comprise:

vegetable oils having a high (for example at least 50 wt %) content of triglycerides, consisting of esters of fatty acids and of glycerol, the fatty acids of which can have varied chain lengths, it being possible for these chains to be linear or branched and saturated or unsaturated. These oils are especially the following: wheat germ, maize, sunflower, linseed, shea, castor, sweet almond, macadamia, apricot, soybean, cottonseed, alfalfa, poppy seed, pumpkin seed, sesame, cucumber, avocado, hazelnut, grape seed, blackcurrant seed, evening primrose, millet, barley, quinoa, olive, rye, safflower, Kendal nut, passionflower or musk rose oil; or else triglycerides of caprylic/capric acids;

synthetic oils of formula $R_5COOR_6$ in which $R_5$ represents an aryl group or the residue of a higher, linear or branched, fatty acid having 7 to 30 carbon atoms and $R_6$ represents a branched or unbranched hydrocarbon chain, possibly hydroxylated, containing 3 to 30 carbon atoms, such as for example the oil PurCellin® (the octanoate of cetostearyl alcohol), isononyl isononanoate, benzoates of $C_{12}$ to $C_{15}$ alcohols, isostearyl benzoate, isopropyl myristate, octanoates, decanoates or ricinoleates of alcohols or polyalcohols;

synthetic ethers, such as petroleum ether;

linear or branched, saturated or unsaturated, $C_6$ to $C_{26}$ fatty alcohols, such as oleic alcohol or octyldodecanol;

optionally, silicone oils such as: polydimethylsiloxanes that are liquid at room temperature; polydimethylsiloxanes having pendant alkyl or alkoxy groups and/or alkyl or alkoxy groups at the end of a silicone chain, which groups have from 2 to 24 carbon atoms; phenylated silicones, such as phenyl trimethicones, phenyl dimethicones, phenyl(trimethylsiloxy)diphenylsiloxanes, diphenyl dimethicones and diphenylmethyldiphenyltrisiloxanes;

mineral oils such as linear or branched hydrocarbons, such as paraffin oils and derivatives thereof, which are optionally refined, vaseline, polydecenes, hydrogenated polyisobutene, such as Parleam®, squalane;

cyclic hydrocarbons such as (alkyl)cycloalkanes and (alkyl)cycloalkenes, the alkyl chain of which is linear or branched and saturated or unsaturated, having from 1 to 30 carbon atoms, such as cyclohexane, dioctylcyclohexane, 2,4-dimethyl-3-cyclohexene and dipentene;

aromatic hydrocarbons such as benzene, toluene, p-cymene, naphthalene and anthracene;

fluorinated oils such as $C_8$ to $C_{24}$ perfluoroalkanes;

fluorosilicone oils;

and mixtures thereof.

It is preferred to use a mineral oil, such as a paraffin oil, such as those sold by Shell under the brand name Sarapar® or that sold by TOTAL under the brand name EDC® 99-DW or EDC® 95-11. This oil has a viscosity of 3.5 cPs. As a variant, it is possible to use a refined paraffin oil, having a content of polycyclic aromatic compounds of less than 3% by weight (determined by DMSO extraction according to the IP 346 method) and a glass transition temperature below −45° C., for example −58° C.±3° C. (as determined according to the ASTM E 1356 standard). Refined oils of this type are in particular:

MES oils, produced by the solvent extraction of heavy petroleum distillates or by treatment of these distillates with hydrogen in the presence of a catalyst (hydrotreatment);

TDAEs, which are treated distillate aromatic extracts.

Examples of such oils are in particular sold by Shell under the brand name Catenex® SNR, by Exxon Mobil under the brand name Flexon® 683, by Total under the brand name Plaxolene® MS or by H&R European under the brand name Vivatec® 500.

Although the above oils are preferred, it is possible, if appropriate, to use more viscous oils, usually called greases. The size of the CNTs and their specific surface area make it possible to manufacture grease-based masterbatches suitable for oil drilling, unlike the CNTs recommended in the prior art.

Examples of greases are in particular:

industrial greases, such as the complex calcium sulphonate greases, available in particular in the CERAN range or under the AXA GR1 reference from the company TOTAL;

speciality greases, such as semi-synthetic greases, bentone-based greases, optionally containing fluorinated compounds, lithium/calcium soap greases and copper-containing greases, particularly those available from the company TOTAL under the brand names MARSON SY 00 and SY 2, SPECIS CU, CALORIS 23 and MS23, STATERMIC XHT and NR, TIFORA PG, BIOMULTIS SEP 2, MULTIS COMPLEX HV2; and mixtures thereof.

The oils may represent 40 to 96.9% by weight, preferably 45 to 90% by weight and better still 50 to 70% by weight relative to the weight of the masterbatch.

In a first embodiment of the invention, apart from CNTs and oil, the masterbatch according to the invention may contain additives such as viscosifiers, salts, especially triethanolamine salts, present in a small amount, that is to say representing in total, for example, 0 to 10% by weight relative to the weight of the masterbatch. Alternatively, in a second embodiment of the invention, the masterbatch consists only of CNTs and the oil or oils.

The viscosifiers may be chosen from thickening homopolymers and copolymers, it being possible for the copolymers to be random or block copolymers, thickening oligomers, surfactants and mixtures thereof.

Examples of thickening polymers are those conventionally used in drilling fluids, and examples that may be mentioned include: guar gum, hydroxypropylguar, carboxymethylguar, hydroxypropylcellulose, hydroxyethylcellulose, sodium carboxymethylcellulose, xanthan gum, starch, polyacrylates, poly(diallyldimethylammonium chloride) and mixtures thereof.

The surfactants may be chosen from all non-ionic, anionic, cationic, amphoteric or zwitterionic surfactants capable of forming micelles (whether spherical, cylindrical, tubular or other forms) above a certain concentration, called the critical micelle concentration. Examples of such surfactants are given in the application EP 1 634 938.

The invention also relates to a process for producing the masterbatch according to the first or the second embodiment of the invention.

This process comprises the steps consisting in:

(a) introducing and then kneading the nanotubes and said at least one oil in a compounding device in order to obtain a composite;

(b) extruding and then cooling said composite so as to obtain a masterbatch in solid form; and (c) forming said masterbatch in order to obtain granules.

It is well understood that the above process may include other, preliminary, intermediate or subsequent, steps in addition to those mentioned above. Thus, it may especially include a preliminary step of mixing the nanotubes with the oil, either in the compounding apparatus or using a separate mixer.

Compounding devices are well known to those skilled in the art. They are conventionally used in the plastics industry for melt-blending thermoplastic polymers and additives in order to produce composites. These devices generally include feed means, especially at least one hopper for pulverulent materials (here, the CNTs) and/or at least one injection pump for liquid materials (here, the oil); high-shear mixing or kneading means, for example a co-rotating or counter-rotating twin-screw extruder (for example a DSM microextruder) or a co-kneader, usually comprising a feed screw placed in a heated barrel (or tube); an output head, which gives the extrudate its shape; and means for cooling the extrudate, either by air cooling or by circulation of water. The extrudate is generally in the form of strands continuously exiting the device and able, after being cooled, to be cut or formed into granules. However, other forms may be obtained by fitting a die of desired shape on the output head.

According to the inventors, the solid form would be due to adsorption of the oil by the CNTs.

Examples of co-kneaders that can be used according to the invention are BUSS® MDK 46 co-kneaders and those of the BUSS® MKS or MX series, sold by the company BUSS AG, which all consist of a screw shaft provided with flights, placed in a heated barrel optionally made up of several parts, and the internal wall of which is provided with kneading teeth designed to cooperate with the flights so as to shear the kneaded material. The shaft is rotated, and given an oscillatory movement in the axial direction, by a motor. These co-kneaders may be equipped with a granulation system, for example fitted at the exit orifice of said co-kneaders, which may consist of an extrusion screw.

The co-kneaders that can be used according to the invention preferably have an L/D screw ratio of 7 to 22, for example 10 to 20, whereas co-rotating extruders advantageously have an L/D ratio from 15 to 56, for example 20 to 50.

The compounding step was generally carried out at a temperature close (for example within ±5° C.) to room temperature (25° C.).

The masterbatch according to the invention, obtained for example using the process described above, may be diluted in a liquid base intended for manufacturing a drilling fluid.

Another subject of the present invention is therefore the use of the masterbatch described above to manufacture a viscoelastic fluid for drilling in subterranean rock formations, which comprises mixing said masterbatch with an aqueous and/or organic liquid base and optionally at least one weighting agent in particulate form.

Yet another subject of the present invention is a process for manufacturing a viscoelastic fluid for drilling in subterranean rock formations, which comprises mixing the masterbatch described above with an aqueous and/or organic liquid base and optionally at least one weighting agent in particulate form.

The masterbatch may be introduced into the liquid base optionally containing the weighting agent in suspension. More particularly, according to one embodiment of the invention, the masterbatch is incorporated directly into the final formulation of the viscoelastic drilling fluid. However, it is preferred to add the weighting agent to the liquid base after the masterbatch has been introduced into said base.

Introducing CNTs into a liquid base for a drilling fluid (or mud) is easily performed using the masterbatch of the invention, unlike directly introducing CNTs into the drilling fluid, and especially on the actual drilling site.

The liquid base may in principle be any base conventionally used in drilling fluids. For example, it may be an aqueous base, advantageously used for economic and environmental reasons. These aqueous bases contain, as is known, water-soluble salts intended mainly to increase the density of the base. The preferred salts comprise sodium, potassium, calcium, zinc and caesium halides and formates, and combinations thereof. Particularly preferred salts that may be mentioned are calcium chloride, calcium bromide, potassium formate, caesium/potassium formate and combinations thereof. These aqueous bases may also contain small fractions of water-miscible and/or water-immiscible organic solvents. The solvents may possibly be dispersed in the form of droplets in the aqueous base in order to form a dispersion/suspension or an oil-in-water (O/W) emulsion.

In the aforementioned cases, introducing the masterbatch into the aqueous base results in the formation of a drilling fluid in the form of a suspension, dispersion or emulsion, especially an oil-in-water (O/W) emulsion.

As a variant, it may be beneficial, or even necessary, to limit the water content of the drilling fluids, for example when the well is passing through rock formations containing a large fraction of water-soluble or water-dispersible components liable to be carried away by the fluid. The liquid base may then be either an oil, or a suspension, dispersion or water-in-oil (W/O) emulsion preferably containing at most 50% by weight, and in particular at most 20% by weight, of water. Introducing the masterbatch into these bases therefore results in a drilling fluid in the form of an oil, a dispersion or an oil-in-water-in-oil (O/W/O) multiple emulsion, respectively.

When the liquid base is in the form of a dispersion or a W/O or O/W emulsion, manufacture of the viscoelastic fluid then also involves introducing at least one surfactant (a W/O or O/W emulsifier, respectively) into the liquid base, or introducing a dispersant capable of stabilising the emulsion or dispersion respectively, which may be chosen from non-ionic or anionic surfactants and may represent for example from 1 to 5% by weight relative to the total weight of the drilling fluid.

The oil constituting the liquid base or else the oil forming the continuous phase of the dispersion or water-in-oil emulsion, or the discontinuous phase of the dispersion or oil-in-water emulsion, is preferably a mineral oil, a fluorinated oil, a diesel oil or a synthetic oil, preferably a mineral oil and especially a hydrocarbon mixture or a synthetic oil. In general, apolar oils are preferred to polar oils. Advantageously, the oil of the liquid base is identical to that of the masterbatch. An oil conventionally used is for example a paraffin oil such as the commercial product EDC® 99-DW from the company TOTAL.

The liquid base described above also optionally contains at least one weighting agent. In principle, any particulate solid having a density greater than that of the liquid base, preferably a density of at least 2 g/cm$^3$, and, for very deep drilling, preferably a density greater than 3 g/cm$^3$, or even greater than 4 g/cm$^3$, may be used as weighting agent. These weighting agents are known and chosen for example from barite ($BaSO_4$), calcite ($CaCO_3$), dolomite ($CaCO_3.MgCO_3$), hematite ($Fe_2O_3$), magnetite ($Fe_3O_4$), ilmenite ($FeTiO_3$) and siderite ($FeCO_3$). The weighting agent used is particularly preferably barite.

The amount of weighting agent essentially depends on the desired drilling fluid density. This density, and therefore the amount of weighting agent used, increases in general progressively with the depth of the drilling well. The drilling fluids of the present invention are preferably intended for very deep drilling and consequently have a relatively high density, preferably an overall density of at least 1.5, preferably greater than 2.5. The upper limit of the content of weighting agent is essentially determined by the viscosity problems that too high a solids content entails. Generally, the weighting agent is used in the drilling fluid manufactured according to the present invention with a concentration between 10 and 70% by weight, for example between 20 and 50% by weight. The percentage concentration of weighting agent can vary greatly depending on the desired density.

The amount of masterbatch introduced into the drilling fluids of the present invention depends, inter alia, on the amount and the density of the weighting agent used, on the drilling depth, on the nature of the base liquid and on whether or not other thickening agents are present in the drilling fluid.

This amount of masterbatch is preferably such that the carbon nanotubes represent 0.1 to 6% by weight, for example 0.1 to 3% by weight, relative to the total weight of the drilling fluid.

It is also preferable according to the invention for the masterbatch and the liquid base to be subjected to a mechanical treatment, preferably before being mixed with the weighting agent. This treatment may be of any type, provided that it makes it possible for the CNTs to be uniformly dispersed in the liquid base. According to the invention, this treatment preferably comprises an ultrasonic treatment or a shearing of the masterbatch dispersion using a rotor-stator system or using a blade kneader.

Such a rotor-stator system generally comprises a rotor driven by a motor and provided with fluid guiding systems perpendicular to the rotor axis, such as paddles or blades placed approximately radially, or a flat disc provided with peripheral teeth, said rotor being optionally provided with a ring gear, and a stator arranged concentrically with respect to the rotor, and at a short distance to the outside of the latter, said stator being equipped, over at least a portion of its circumference, with openings provided for example in a grid or defining between them one or more rows of teeth, which are suitable for passage of the fluid drawn into the rotor and ejected by the guiding systems towards said openings. One or more of the aforementioned teeth may be provided with sharp edges. The fluid is thus subjected to a high shear, both in the gap between the rotor and the stator and through the openings provided in the stator.

One example of a rotor-stator system is in particular that sold by the company SILVERSON under the brand name Silverson® L4RT. Another type of rotor-stator system is sold by the company IKA-WERKE under the brand name Ultra-Turrax®. Yet other rotor-stator systems consist of colloid mills, turbine deflocculators and high-shear mixers of the rotor-stator type, such as the machines sold by the company IKA-WERKE or by the company ADMIX.

According to the invention, the speed of the rotor is preferably set at at least 1000 rpm and preferably at least 3000 rpm or even at least 5000 rpm, for example for to 15 minutes. Furthermore, the width of the gap between the rotor and the stator is preferably less than 1 mm, preferably less than 200 µm, more preferably less than 100 µm and better still less than 50 µm or even less than 40 µm. Moreover, the rotor-stator system used according to the invention advantageously applies a shear rate ranging from $10^3$ to $10^9$ $s^{-1}$.

In one particular embodiment of the present invention, the CNTs constitute the sole thickening agent, that is to say the drilling fluid is essentially free of other known thickening agents, such as organic polymers, fatty acids, clays or thickening systems based on surfactants or on electrolytes, such as those described in EP 1 634 938. The CNT concentration in the drilling fluid is then relatively high, preferably between 1 and 6% by weight, particularly between 1.5 and 3% by weight, relative to the weight of the viscoelastic drilling fluid. This is because experience has shown that when other thickening agents are absent, the yield point of the drilling fluids increases spectacularly above a minimum value of the order of 1% by weight of CNT.

The carbon nanotubes are also useful for enhancing the effect of conventional thickening systems, for example polymer-based thickening systems. In another embodiment of the present invention, the drilling fluids obtained according to the present invention thus also contain one or more organic polymers soluble in the aqueous phase and/or in the oily phase of the liquid base. The CNT concentration is then preferably between 0.1 and 1% by weight relative to the weight of the viscoelastic drilling fluid.

The drilling fluid obtained from the masterbatch according to the invention is intended to be used in a process for drilling subterranean rock formations.

Thanks to the excellent heat resistance of the CNTs used according to the invention, they are particularly appropriate for very deep drilling, that is to say under high-temperature (generally 200° C. or higher, particularly 250° C. or higher) and high-pressure conditions (generally above 10 000 psi for an HTHP well, and even above 30 000 psi for an extreme HTHP well).

During drilling, it is possible for one or more thickening agents present in the fluid, chosen for example from clays (bentonite, montmorillonite, attapulgite, organophilic clays) or organic polymers, to be progressively replaced with carbon nanotubes as the drilling depth, the drilling temperature and/or the drilling pressure increases. It may in fact be worthwhile, mainly for drilling fluid production cost reasons, to use known and inexpensive thickening agents, such as organic polymers and/or thickening clays, at the start of drilling and to introduce the CNTs only beyond a certain depth when the thermal degradation of the organic polymers or the excessive solids content provided by clays starts to pose the problems described in the introduction.

The invention will be better understood in the light of the following examples, which are given purely by way of illustration and are not intended to limit the scope of the invention as defined by the appended claims.

EXAMPLES

Example 1: Production of a Masterbatch

Carbon nanotubes (Graphistrength® C100 from ARKEMA) were introduced into the feed well of zone 1 of a BUSS® MDK 46 (11 L/D) co-kneader. An equivalent weight of mineral oil (EDC® 99 DW from TOTAL), i.e. having the same weight as that of the CNTs, was introduced into the injection pump of the first zone of the machine, before the first restriction ring. The kneading was carried out at room temperature. Solids strands were obtained at the exit of the co-kneader, which were cut, without using water jets, to obtain a masterbatch in the form of solid granules containing 50% by weight of CNT and 50% by weight of oil.

Example 2: Production of a Masterbatch

Carbon nanotubes (Graphistrength® C100 from ARKEMA) were introduced into the feed well of zone 1 of a BUSS® MDK 46 (11 L/D) co-kneader. An equivalent weight of mineral oil (EDC® 99 DW from TOTAL), i.e. having the same weight as that of the CNTs, was introduced into the injection pump of the first zone of the machine, before the first restriction ring. The kneading was carried out at room temperature. Solids strands were obtained at the exit of the co-kneader, which were cut, without using water jets, to obtain a masterbatch in the form of solid granules containing 20% by weight of CNT and 80% by weight of oil.

Example 3: Manufacture of a Drilling Fluid

The masterbatch of Example 2 was impregnated with the same mineral oil as that used for its preparation, in an amount of 1 part by weight of masterbatch per 2 parts by weight of oil, for at least 8 hours. The suspension was then rediluted in the same oil, so as to achieve a CNT content of 1% by weight. This suspension was then subjected to a mechanical treatment in a rotor-stator system (a Silverson® L4RT machine from SILVERSON) for 10 minutes in order to obtain a stable CNT dispersion, that is to say one showing no visible sedimentation after 24 hours. A weighting agent such as barite was then introduced into this dispersion in order to obtain a drilling fluid.

The invention claimed is:

1. Masterbatch comprising at least one oil and more than 3% by weight of multi-walled carbon nanotubes having from 3 to 15 sheets, a mean diameter of between 5 and 30 nm and a specific surface area greater than 200 $m^2/g$, said oil being chosen from: vegetable oils having a high content of triglycerides, consisting of esters of fatty acids and of glycerol; synthetic oils of formula $R_5COOR_6$ in which $R_5$ represents an aryl group or the residue of a higher, linear or branched, fatty acid having 7 to 30 carbon atoms and $R_6$ represents a branched or unbranched hydrocarbon chain, possibly hydroxylated, containing 3 to 30 carbon atoms; synthetic ethers;

linear or branched, saturated or unsaturated, $C_6$ to $C_{26}$ fatty alcohols; mineral oils; cyclic hydrocarbons; aromatic hydrocarbons; fluorinated oils; fluorosilicone oils; and mixtures thereof;

wherein the masterbatch is in the form of solid granules.

2. Masterbatch consisting of at least one oil and of more than 3% by weight of multi-walled carbon nanotubes having from 3 to 15 sheets, a mean diameter of between 5 and 30 nm and a specific surface area greater than 200 m²/g, said oil being chosen from vegetable oils having a high content of triglycerides, consisting of esters of fatty acids and of glycerol; synthetic oils of formula $R_5COOR_6$ in which $R_5$ represents an aryl group or the residue of a higher, linear or branched, fatty acid having 7 to 30 carbon atoms and $R_6$ represents a branched or unbranched hydrocarbon chain, possibly hydroxylated, containing 3 to 30 carbon atoms; synthetic ethers; linear or branched, saturated or unsaturated, $C_6$ to $C_{26}$ fatty alcohols; mineral oils; cyclic hydrocarbons; aromatic hydrocarbons; fluorinated oils; fluorosilicone oils; and mixtures thereof.

3. Masterbatch according to claim 2, wherein the at least one oil is chosen from oils having a dynamic viscosity at room temperature of between 0.1 cP and 500 cP.

4. Masterbatch according to claim 1, wherein the masterbatch contains from 10 to less than 60% by weight of the multi-walled carbon nanotubes.

5. Masterbatch according to claim 1, wherein the masterbatch contains 10 to 55% by weight of the multi-walled carbon nanotubes.

6. Process for producing a masterbatch according to claim 1, wherein the process comprises the steps of:
(a) introducing and then kneading the multi-walled carbon nanotubes and said at least one oil in a compounding device in order to obtain a composite;
(b) extruding and then cooling said composite so as to obtain a masterbatch in solid form; and
(c) forming said masterbatch in order to obtain granules.

7. Process for the manufacture of a viscoelastic fluid for drilling subterranean rock formations, which comprises mixing a masterbatch according to claim 1 with an aqueous and/or organic liquid base and optionally at least one weighting agent in particulate form.

8. Process for manufacturing a viscoelastic fluid for drilling in subterranean rock formations, which comprises mixing the masterbatch according to claim 2, with an aqueous and/or organic liquid base and optionally at least one weighting agent in particulate form.

9. Process according to claim 8, wherein said weighting agent has a density of at least 2 g/cm³.

10. Process according to claim 8, wherein the weighting agent is barite.

11. Process according to claim 8, wherein the viscoelastic fluid contains 0.1 to 6% by weight of multi-walled carbon nanotubes.

12. Process according to claim 8, wherein the masterbatch and the liquid base are subjected to a mechanical treatment using ultrasound or a rotor-stator system or a blade mixer.

13. Process according to claim 8, in which the masterbatch is incorporated directly into the final formulation of the viscoelastic drilling fluid.

14. Masterbatch according to claim 2, wherein the masterbatch contains from 10 to less than 60% by weight of the multi-walled carbon nanotubes.

15. Process according to claim 7, wherein said weighting agent has a density of at least 2 g/cm³.

16. Process according to claim 7, wherein the weighting agent is barite.

17. Process according to claim 7, wherein the viscoelastic fluid contains 0.1 to 6% by weight of multi-walled carbon nanotubes.

18. Process according to claim 7, wherein the masterbatch and the liquid base are subjected to a mechanical treatment using ultrasound or a rotor-stator system or a blade mixer.

19. Process according to claim 7, in which the masterbatch is incorporated directly into the final formulation of the viscoelastic drilling fluid.

20. Process for producing a masterbatch according to claim 2, wherein the process comprises the steps of:
(a) introducing and then kneading the multi-walled carbon nanotubes and said at least one oil in a compounding device in order to obtain a composite;
(b) extruding and then cooling said composite so as to obtain a masterbatch in solid form; and
(c) forming said masterbatch in order to obtain granules.

21. Masterbatch according to claim 2, wherein the masterbatch is in the form of solid granules.

22. Masterbatch according to claim 1, wherein the multi-walled carbon nanotubes have from 5 to 10 sheets.

23. Masterbatch according to claim 2, wherein the multi-walled carbon nanotubes have from 5 to 10 sheets.

* * * * *